(12) United States Patent
Bass

(10) Patent No.: US 6,769,976 B2
(45) Date of Patent: Aug. 3, 2004

(54) STUNNING DEVICE FOR KILLING SMALL ANIMALS OR FISH

(76) Inventor: Richard Bass, 76 Henderson Rd., Sheldon, Qld (AU), 4157

( * ) Notice: Subject to any disclaimer, the term of this patent is extended or adjusted under 35 U.S.C. 154(b) by 0 days.

(21) Appl. No.: 10/297,940

(22) PCT Filed: Jun. 22, 2001

(86) PCT No.: PCT/AU01/00745
§ 371 (c)(1),
(2), (4) Date: Dec. 20, 2002

(87) PCT Pub. No.: WO01/97621
PCT Pub. Date: Dec. 27, 2001

(65) Prior Publication Data
US 2003/0171085 A1 Sep. 11, 2003

(30) Foreign Application Priority Data
Jun. 22, 2000 (AU) .............................................. PQ 8310
Nov. 10, 2000 (AU) .............................................. PR 1401

(51) Int. Cl.$^7$ ................................................ A22B 3/02
(52) U.S. Cl. ........................................... 452/62; 452/57
(58) Field of Search ..................................... 492/57–62

(56) References Cited

U.S. PATENT DOCUMENTS

| | | | | |
|---|---|---|---|---|
| 3,782,018 A | * | 1/1974 | Hancox ....................... | 42/1.12 |
| 3,996,644 A | * | 12/1976 | Andersson ................... | 452/58 |
| 4,353,147 A | * | 10/1982 | Nijhuis ....................... | 452/53 |
| 4,571,777 A | * | 2/1986 | Nijhuis ....................... | 452/54 |
| 4,575,900 A | | 3/1986 | Hamel et al. | |
| 4,748,719 A | * | 6/1988 | Bowman et al. .............. | 452/54 |
| 5,326,307 A | * | 7/1994 | Bernardus et al. ............ | 452/58 |
| 5,486,145 A | * | 1/1996 | Dorsthorst et al. ........... | 452/58 |
| 5,692,951 A | * | 12/1997 | Huff ........................... | 452/62 |
| 5,727,996 A | * | 3/1998 | Newton ....................... | 452/57 |
| 6,001,011 A | * | 12/1999 | Johnson ....................... | 452/65 |
| 6,183,356 B1 | * | 2/2001 | Middleton et al. ............ | 452/57 |

FOREIGN PATENT DOCUMENTS

| | | | |
|---|---|---|---|
| DE | 4037203 | * | 5/1992 |
| DE | 42 16 842 | | 11/1993 |
| EP | 0743005 | * | 11/1996 |
| FR | 2599223 | * | 12/1987 |
| WO | WO 81/03108 | * | 11/1981 |
| WO | WO97/01285 | | 1/1997 |
| WO | WO98/44805 | | 10/1998 |

* cited by examiner

Primary Examiner—Peter M. Poon
Assistant Examiner—David Parsley
(74) Attorney, Agent, or Firm—Hoffman Wasson & Gitler, P.C.

(57) ABSTRACT

Stunning device (1) for small animals or fish of 2 kg to 7 kg weight comprises pneumatically powered piston assembly (2) which includes an extendible piston. Support (3) for piston assembly (2) includes base member (4) and multi-component trigger (22, 23, 24, 26). Piston assembly (2) is positioned to define a space between base member (4) and head plate (21) for receiving the head (27) of the animal. When the piston is activated by head (27) contacting plate (22), it extends and strikes head (27) just behind and/or between the eyes with sufficient force to kill the animal with a shock to the brain, but without affecting the external appearance of the animal or fish. The piston extends only once and then retracts, and trigger (22, 23, 24, 26) is reset by removing head (27) from device (1).

26 Claims, 5 Drawing Sheets

STUNNING DEVICE FOR KILLING SMALL ANIMALS OR FISH

This invention relates to apparatus which can be used to stun, or slaughter, small animals and fish. In particular, the invention relates to pneumatically operated apparatus.

BACKGROUND FIELD

Processing of animals for food usually involves the initial slaughter of the animal. In the processing of larger animals such as cattle, this is typically done by a blow to an animal's head using a pneumatically- or cartridge-powered gun with a captive bolt or piston in place of a projectile.

Processing of some fishes also requires slaughter as an initial step in the process. For example, salmon are typically "stunned" by a blow to the head before processing as food. In many instances, the blow is applied with a simple club, there being no readily available apparatus for the procedure. Smaller animals such as rabbits are similarly stunned by a blow to the head, there again being no readily available apparatus suitable for use with animals of this size.

Any apparatus must be capable of delivering a blow to the head of an animal or fish in such a way that stunning can be done humanely. For most processing needs, the apparatus must also be capable of delivering blows quickly and repetitively so that large numbers of animals or fish can be processed.

Pneumatically powered apparatus is used for larger animals because it meets the needs set out in the previous paragraph. However, such apparatus is not suitable for use with smaller animals or fish. Smaller hand-held pneumatic devices are known—for example, pneumatically powered nail guns—but these are not suitable for use as a fish or animal stunning device because of their configurations. Such devices are nevertheless capable of delivering an adequate force.

SUMMARY OF THE INVENTION

The object of the invention is to provide a stunning device that can be used for the rapid and repetitive stunning of small animals or fish and that utilizes pneumatic power.

In a broad format, the invention provides an animal or fish stunning device comprising:

- a pneumatically-powered piston assembly comprising a piston retractably extendable from an open ended cylinder included in said assembly;
- a support for said piston assembly including a base member, wherein said piston assembly is positioned with respect to said base member to define a space between said base member and said cylinder open end for receiving a head of an animal or fish, and wherein said piston can extend partially into said space; and
- a trigger for activating extension of said piston when said trigger is contacted by the head of said animal or fish when positioned in said space.

The operating principle of the stunning device according to the invention is that that the animal or fish is killed by a blow to the head administered by the piston of the device. The action is initiated by insertion of the animal's or fish's head into the space between the base member of the support for the piston assembly and the open end of the cylinder whereby contact with a trigger activates the piston. The trigger and cylinder are configured such that when the piston is activated, it strikes the animal or fish just behind and/or between the eyes. This impact is sufficient to kill the animal or fish due to the shock to the brain.

A design feature of the device is that when activated, the piston extends only once and then retracts. Removal of the animal or fish resets the trigger so that the device can be immediately used to stun another animal or fish.

The piston assembly of devices according to the invention is advantageously pivotally mounted to the support so that the distance between the base member and the open end of the cylinder can be adjusted to allow use with differently sized animals and fishes. The piston assembly can be either fixed in a particular position or mounted such that some degree of movement is possible. This allows for automatic adjustment of the distance between the base member and the open end of the cylinder when differently sized individuals of the same species of animal or fish are to be slaughtered.

The mounting of the piston assembly to the support is typically such that the assembly can be demounted to allow cleaning of both components. Devices advantageously include guide plates to facilitate insertion of the head of the animal or fish into the space between the base member of the support and the open end of the cylinder. Preferably, the distance between guide plates at each side of the entrance to the device is adjustable. Advantageously, the entire device can be dismantled for cleaning of all components.

The support for the piston assembly advantageously comprises a planar base member and planar side members. Alternatively, the support can be a framework of elongate members.

The pneumatic operation of the piston is typically effected by incorporating apparatus commonly known as a "nail gun" in the piston assembly of devices according to the invention. As such guns are typically capable of repetitive firing on activation, devices include a mechanism which allows only a single extension of the piston. This will be explained in greater detail below. However, it will be appreciated by one of skill in the art of the manufacture of such devices that the pneumatically-operated piston can be any suitable assembly including a purpose-built assembly.

Devices according to the invention can be used with small animals and are particularly suited for use with animals having a weight of 2 to 7 kg. With regard to fishes, devices can be conveniently used with fish having a weight of up to about 7 kg such as salmon, trout and sea bass. Devices are most particularly suited for the stunning of salmon during the commercial processing thereof.

With devices according to the invention, animals or fish to be processed can be rapidly and efficiently stunned with minimal risk of injury to the operator. Furthermore, as triggering is effected by the head of the animal or fish, both hands of the operator can be used to guide the head of the animal or fish into the device. An additional advantage of devices according to the invention is that the external appearance of the animal or fish is not affected by the killing process. This is particularly important for sale of whole fish. The quality of fish is also enhanced through more rapid and humane killing at the point of harvest.

Having broadly described the invention, stunning devices will now be exemplified with reference to the drawings briefly described hereafter.

The same item number has been used for features appearing in more than one drawing.

BEST MODE AND OTHER MODES OF CARRYING OUT THE INVENTION

The devices depicted in the figures are designed for the stunning of adult salmon in the commercial processing thereof. However, it will be appreciated that with appropriate reconfiguration, the device can be adapted for use with other fishes or animals.

Figure 1:
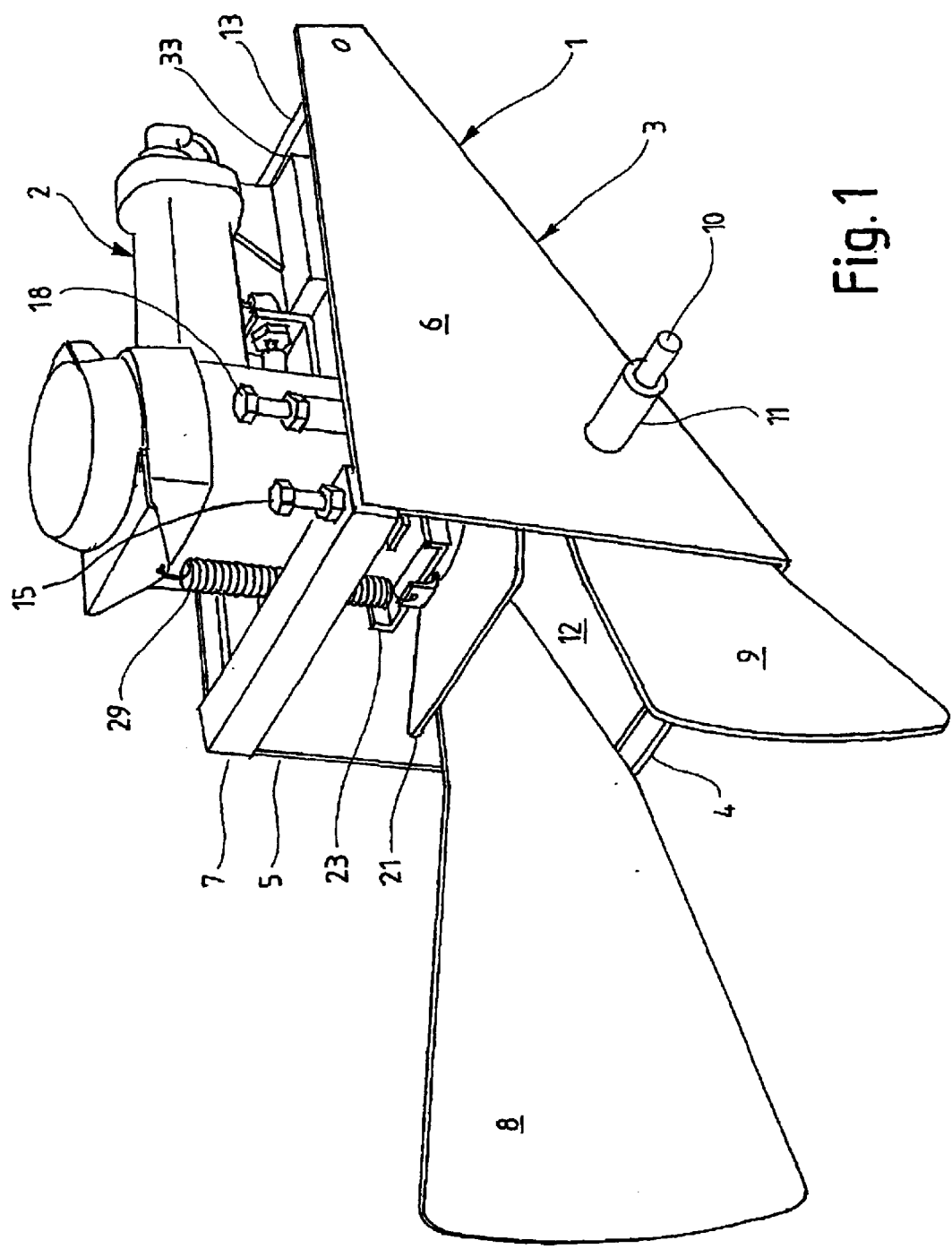
FIG. 1 is a perspective view of a device according to the invention.
Figure 2:
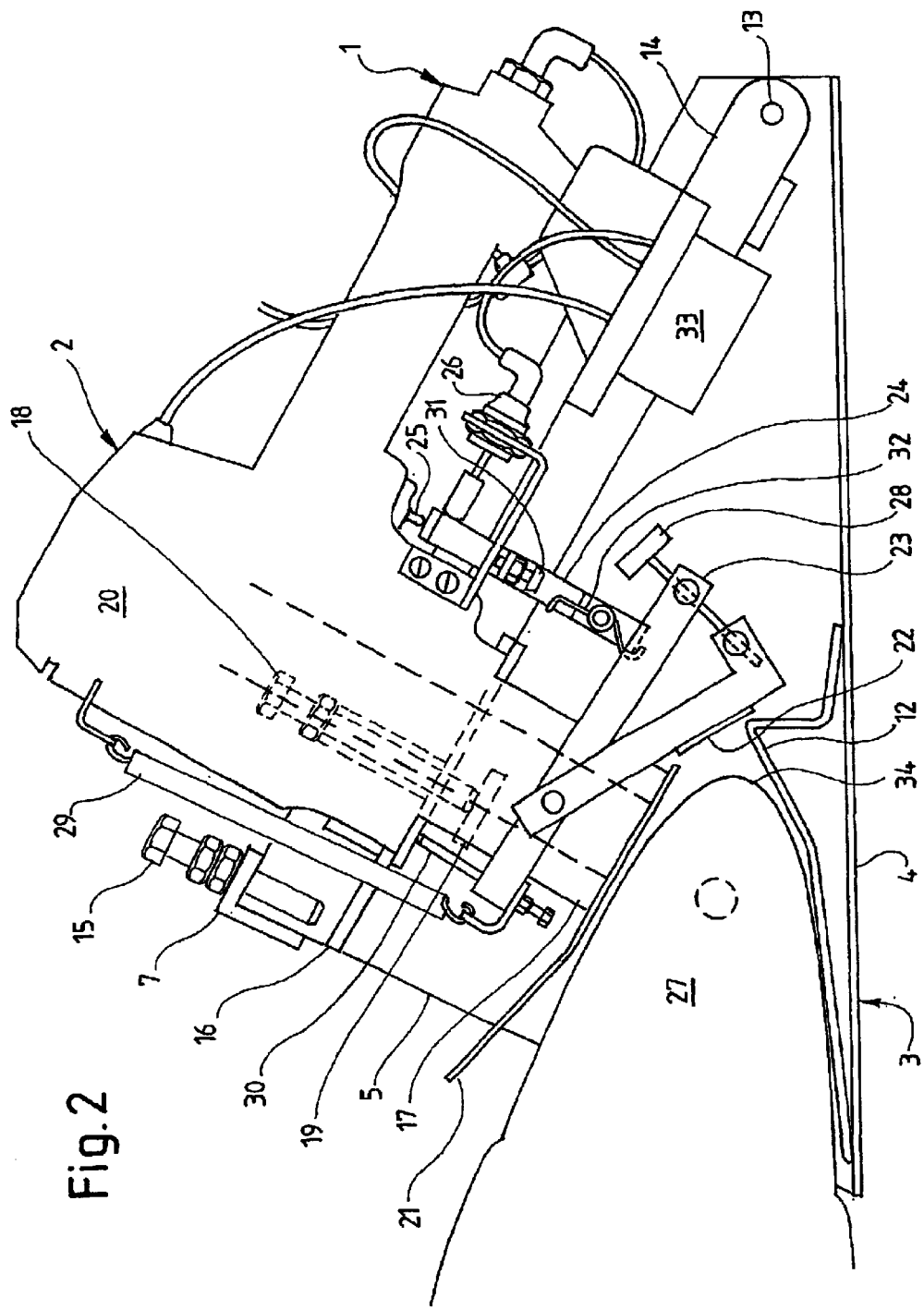
FIG. 2 is a side view of the device shown in FIG. 1 with portions of the support for the piston assembly omitted.

In FIGS. 1 and 2, there is shown device 1 comprising piston assembly 2 and support assembly 3. To first deal with the support assembly, this comprises a planar base member 4 and planar side members 5 and 6 linked by a cross-piece 7. In FIG. 2, side member 6 has been omitted so that other features of the device can be seen. Support assembly 3 further includes guide plates 8 and 9 that are adjustably fixed to side members 5 and 6, respectively. Taking guide plate 9 as an example, fixing is via a shaft 10 extending from an end of the guide plate, which shaft can be locked—typically via a threaded stud—into a collar 11 on side member 6. Base member 4 has fixed thereto a chin plate 12 which aids proper positioning of the head of the fish in the device as will be explained below.

Turning to piston assembly 2, this is pivotally mounted to an axle 13 extending between side members 5 and 6 to which rails at each side of the assembly are connected. One of these rails is item 14 of FIG. 2 which is the rail furthest the viewer. The rail at the other side of the piston assembly has been omitted to again allow features of the assembly to be seen. Pivoting of piston assembly 2 is limited in movement away from base member 4 by adjusting screw 15 in cross-piece 7 which contacts a tab 16 extending from the assembly. The minimum distance between open ended cylinder 17 from which the piston of the piston assembly extends and chin plate 12 is set by an adjusting screw 18 on the piston assembly which contacts a tab 19 projecting inwardly from side member 6. Adjusting screw 18 and tab 19 are shown in phantom in FIG. 2. It will be appreciated from FIG. 2 that with adjusting screws 15 and 18 set as shown, some pivoting of piston assembly 2 is still possible. That is, the piston assembly can pivot until tab 16 contacts the end of adjusting screw 15. This allows adjustment of the distance between cylinder 17 and chin plate 12 to compensate for differently sized fish.

Cylinder 17 is essentially a sleeve mounted to a standard pneumatic gun 20, the particular gun in the example being a Max Model No. NF510 manufactured by Max Co., Ltd, Tokyo, Japan. The cylinder bore is indicated by the dashed lines in FIG. 2. The normal piston of the gun is replaced with a sealed hollow stainless steel cylinder of about 100 mm in length. The end of the piston that extends from the cylinder has a convex curvature to minimise damage to fish to be stunned which could occur with a piston having a flat extremity. The cylinder has mounted at its open end a head plate 21, with an appropriate aperture therein to allow passage of the piston, to further aid positioning of a fish in the device.

The trigger of device 1 comprises a contact plate 22 adjustably linked to a pivot frame 23 which has a pushrod 24 extending therefrom for contacting the activating button 25 of pneumatic gun 20. Pushrod 24 is also acted on by a pneumatic pushrod 26 that disengages pushrod 24 from button 25 during operation of the device. This will be explained below. The position of contact plate 22 relative to the head 27 of a fish positioned in the device can be set by adjusting the angle between the contact plate and pivot frame 23 via adjusting screw 28. Pivot frame 23 is biased to a pre-firing position as shown in FIG. 2 by spring 29 with the position adjustable via a stop screw 30. The movement of pushrod 24 is limited by a stop screw 31 and the pushrod is biased to the button 25 contact position shown in FIG. 2 via spring 32. The piston assembly also includes a five-way valve 33, the function of which will be described below.

Device components such as the support assembly 3 are typically fabricated from a corrosion resistant metals material. A preferred material is stainless steel. The support assembly of the exemplified device has a length of about 370 mm, a width of about 185 mm, and a height of about 205 mm. The pneumatic nail gun component 20 of the piston assembly utilizes a normal air supply of 3.0 to 5.0 bar and typically operates at 3.5 bar. The device is suitable for stunning fish such as salmon of 2 to 7 kg.

Operation of device 1 will now be described. To stun a fish, the head 27 thereof is positioned in the space between head plate 21 and chin plate 12 aided by guide plates 8 and 9. Movement of fish head 27 further into this space ultimately results in the nose 34 of the fish meeting contact plate 22 which causes pushrod 31 to depress button 25 of pneumatic gun 20. The piston then extends from cylinder 17 by up to about 30 mm thereby contacting the head of the fish. To prevent multiple firing of the gun (which would result in excessive damage to the fish), pushrod 24 is stopped by stop screw 31 so that depression of button 25 is only to an initial (single fire) position. To allow immediate retraction of the piston, pushrod 24 is disengaged from button 25 by pneumatic pushrod 26. The latter pushrod is activated by five-way valve 33 which senses a drop of pressure on firing of the gun to extend the piston with air being diverted to the pushrod. On removal of the stunned fish, contact plate 22 and pushrod 24 are returned to the positions shown in FIG. 2 under the action of springs 29, and 32, respectively.

The device is then ready for repetition of the foregoing procedure.

Device 1 is typically fixed to a horizontal surface, such as a bench top, for use. However, it will be appreciated that the device can be used in any orientation.

In a variant of the device exemplified above, the pneumatic pushrod 26 and five-way valve 33 can be replaced by a spring-extended double acting cylinder arrangement, thus avoiding the need for the five-way valve.

Figure 3:
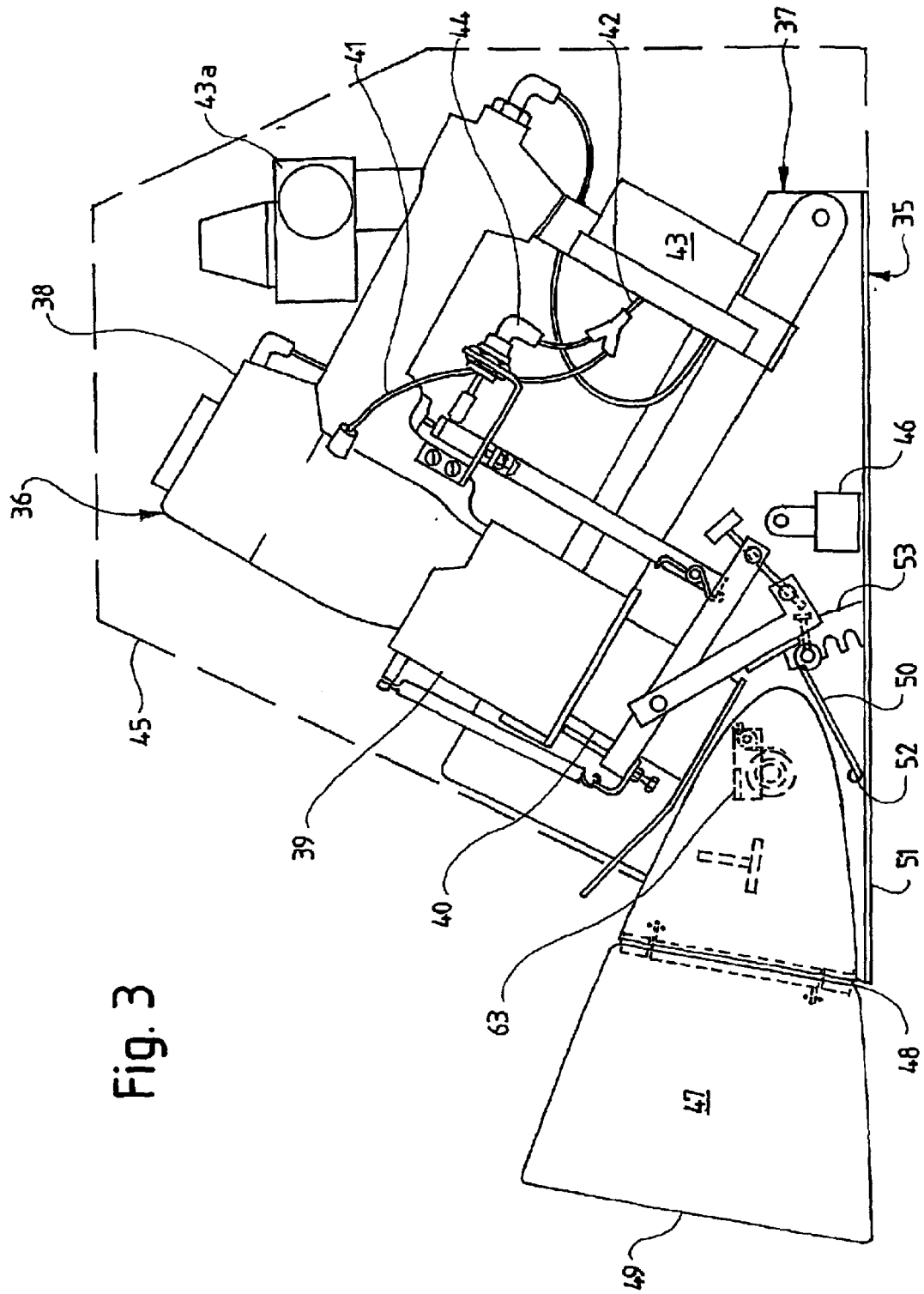
FIG. 3 is a side view of another device according to the invention with a side member of a support assembly omitted to expose features of the device.
Figure 4:
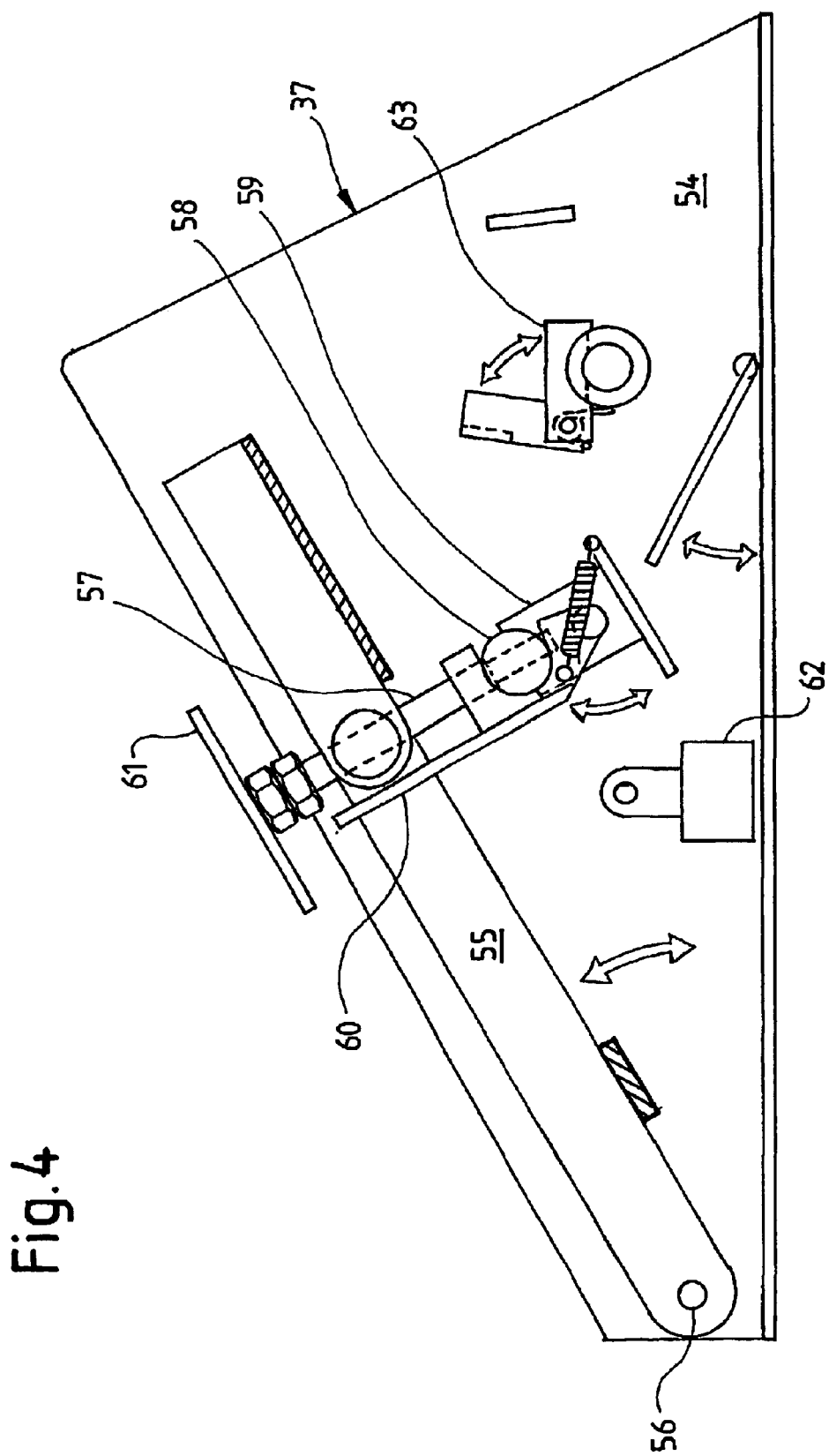
FIG. 4 is a side view of the support assembly of the device shown in FIG. 3 with components omitted to expose adjustment and release mechanisms.

A variant of the device shown in FIGS. 1 and 2 is depicted in FIGS. 3 and 4. With reference to FIG. 3, there is shown device 35 comprising piston assembly 36 and support assembly 37. The support assembly 37 is essentially the same as support assembly 3 of the device described above. Differences will be discussed below.

The piston assembly 36 includes a standard pneumatic gun 38 which in this case is a Max Model No. NF352-ST/16-50 obtainable from Max Co., Ltd, Tokyo, Japan. As this gun has a shorter barrel than the gun used in the FIGS. 1 and 2 device, a sleeve 39 is mounted between gun 38 and cylinder 40, which cylinder 40 is similar to cylinder 17 of the FIGS. 1 and 2 device. In the present case, the piston within cylinder 40 is solid and is connected to the piston of gun 38 by a solid rod not shown in the figure. The piston is grooved at its upper end, which groove has an o-ring therein. The o-ring prevents slippage of the piston in between firings of the gun. These details are again not shown in the figure.

The trigger mechanism of device 35, and the operation thereof, is the same as the trigger mechanism of the FIG. 1 and 2 device. One difference in the operation of the gun, however, is that there is a supply of air to the body of gun 38 which air acts on the underside of the gun piston to aid retraction of the piston after firing. This supply of air is from a branch line 41 of the air line 42 from five-way valve 43 to the pushrod 44 that is the equivalent of pushrod 26 of the FIGS. 1 and 2 device. Consequently, after the gun is fired, there is a momentary supply of air through line 42 and hence then to the gun body via line 41 to aid cylinder retraction.

Device 35 further includes a pressure relieve valve 43a which receives air from a compressor. The device typically operates at 5.0 bar.

Device 35 also has a cover, shown in phantom as 45 in FIG. 3, secured to support assembly 37 by a spring clip on each side of the device, one of which spring clips is shown at 46. The device has two guide plates like those of the FIGS. 1 and 2 device but of the same length. One of the guide plates, 47 of FIG. 3, is hinged at its mid-point 48 with the distal half 49 biased away from the centre of the device. When the device is mounted close to a wall with guide plate 47 on the side of the device closest the wall, the distal half 49 will contact the wall thereby closing any gap between the device and the wall. This prevents a fish entering the gap between the device and the wall. The distance between the guide plates can be adjusted by the independent setting of each plate by a mechanism to be explained in detail below.

The angle of chin plate 50 of device 35 can be adjusted. The chin plate is pivotally mounted to the base 51 of support assembly 37 at 52. A spring-loaded pin at the distal end of the chin plate is received in one of the notches in a notched plate 53 on a side wall of the support assembly.

Figure 5:
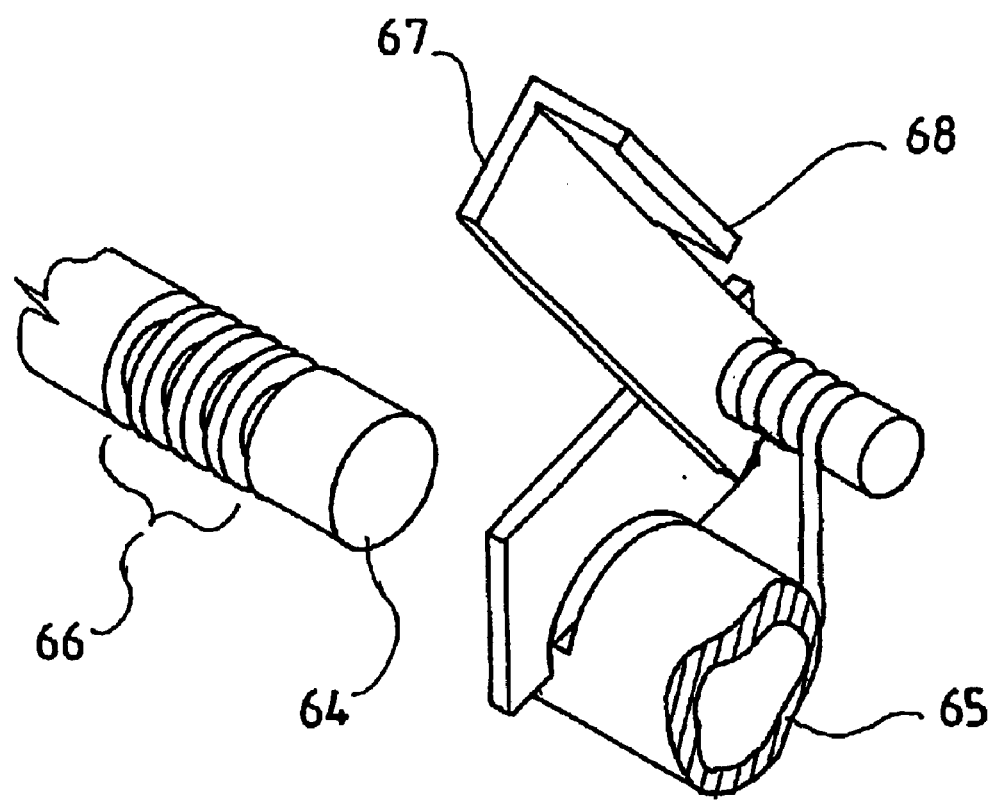
FIG. 5 is a detailed view of the adjustable mounting for a guide plate.

Greater detail of adjustment mechanisms is presented in FIGS. 4 and 5. In FIG. 4, there is shown the base member 51 and a side member 54 of support assembly 37. A support rail 55 for gun 38 is pivotally mounted at 56 to side member 54. The position of the gun is adjustable by virtue of adjusting screw 57.

To aid cleaning of the device, piston assembly 36 can be pivoted out of support assembly 37 once cover 45 has been removed. To allow this, a boss 58 at the end of adjusting screw 57 can be released from a clasp 59 therefor by virtue of a lever 60 acted on by an over-centre spring which normally retains the clasp about boss 58.

Adjusting screw 57 is adjacent side wall 54. The upper end of the screw has a tee-piece 61. This tee-piece cannot rotate when the adjusting screw is locked in position and cover 45 is in situ. Consequently, movement generated by operation of gun 38 does not alter the setting of rail 55 and hence the position of cylinder 40 relative to base member 51 (see FIG. 3).

When lever 60 is in the released position—which can only occur when cover 45 is removed—the lever lies across spring clip 62, the complement of spring clip 46 of FIG. 3. Consequently, the cover cannot be refitted. This prevents use of the device when adjusting screw 57 is not properly latched. Spring clips 46 and 62 can be interlinked so that blocking of only one clip prevents operation of both clips.

A mechanism for the adjustable mounting of a guide plate to side member 54 is shown at 63 of FIG. 4 and in more detail in FIG. 5, the latter being an exploded view. FIG. 5 shows a shaft 64 which projects from the end of the guide plate within the support assembly (see FIG. 3). This shaft is received in a boss 65 on a side wall of the support assembly. Shaft 64 includes a plurality of grooves 66 into one of which a spring loaded plate 67 can drop when the shaft is in boss 65. This locks shaft 64 in a particular position and thus sets the position of the attached guide plate relative to the side walls of the support assembly. Lifting plate 67 via tab 68 allows repositioning of the shaft and hence the guide plate.

The device illustrated in FIG. 3 is operated in the same manner as the FIGS. 1 and 2 device.

It will be appreciated that many changes can be made to the stunning devices and use thereof as exemplified above without departing from the broad ambit and scope of the invention.

The term "comprise", or variants thereof such as "comprising" or "comprised", is used herein to denote the inclusion of a stated integer or integers, unless is the context of usage an exclusive interpretation of the term is required.

What is claimed is:

1. An animal or fish stunning device comprising:
   a pneumatically-powered piston assembly comprising a piston retractably extendable from an open ended cylinder included in said assembly, wherein said piston assembly comprises a pneumatic gun with a sleeve as said cylinder;
   a support for said piston assembly including a base member, wherein said piston assembly is positioned with respect to said base member to define a space between said base member and said cylinder open end for receiving a head of an animal or fish, and wherein said piston can extend partially into said space; and
   a trigger for activating extension of said piston when said trigger is contacted by the head of said animal or fish when positioned in said space, wherein said trigger comprises:
   a contact plate adjustably linked to a pivot frame having a first pushrod extending therefrom for contacting an activating button of said gun; and
   a second, pneumatically operated, pushrod that disengages said first pushrod from said button immediately after activation of said button;
   wherein said pivot frame is biased to a pre-firing position and said first pushrod is biased towards said button to prevent refiring of said piston while said head of said animal or fish is in contact with said trigger.

2. The device according to claim 1, wherein said piston assembly is pivotally mounted to said support.

3. The device according to claim 2, wherein an adjustment mechanism is provided to limit pivoting of said piston assembly or to fix said piston assembly into a desired position relative to said base member.

4. The device according to claim 3, wherein said adjustment mechanism comprises screws that abut tabs projecting from said piston assembly mounting or said support therefor.

5. The device according to claim 3, wherein said adjustment mechanism comprises an adjusting screw on said piston assembly support that engages a threaded boss on said support.

6. The device according to claim 5, wherein said boss can be disconnected from said support to permit pivoting of said piston assembly out of said support.

7. The device according to claim 6, wherein said boss is connected to said support via a clasp that can be opened for pivoting of said piston assembly.

8. The device according to claim 7, wherein opening of said clasp is via a lever acted on by an over-centre spring that normally holds said clasp closed.

9. The device according to claim 1, wherein mounting of said piston assembly to said support is via a pair of parallel rails pivotally connected at an end of each rail to said support.

10. The device according to claim 9, wherein said pivotal connection is via an axle spanning said support.

11. The device according to claim 1, wherein said support comprises a planar base member and planar side members.

12. The device according to claim 1, wherein an upright guide plate is provided at each side of side support at said space defined by said base member and said cylinder open end.

13. The device according to claim 12, wherein each said guide plate is adjustably mounted to said support for varying the distance therebetween.

14. The device according to claim 13, wherein said adjustable mounting comprises a shaft extending from a guide plate that is received in a boss on said support and is locked into position by a threaded stud in said boss.

15. The device according to claim 13, wherein said adjustable mounting comprises an annularly grooved shaft extending from a guide plate that is received in a boss on said support and is held in position by a backing plate that docks in a groove.

16. The device according to claim 12, wherein a distal portion of at least one of said guide plates is hinged and biased away from said device.

17. The device according to claim 1, wherein said base member has a ramped member in said space, and wherein said ramped member acts as a chin plate.

18. The device according to claim 17, wherein the slope of said ramped member is adjustable.

19. The device according to claim 1, wherein a spacer sleeve is positioned between said cylinder and said gun body.

20. The device according to claim 1, wherein said device includes a multiple-outlet valve for controlling supply of air to device components.

21. The device according to claim 1, wherein an air line from a multiple-outlet valve is connected to said gun body to supply air to the underside of said gun piston to aid retraction of said cylinder piston after firing of said gun.

22. The device according to claim 1, wherein said piston includes an o-ring seal to prevent slippage of said piston after retraction thereof.

23. The device according to claim 1, wherein a cover is provided over said device with an opening therein that coincides with the space between said base member and said cylinder open end.

24. The device according to claim 23, which further includes a mechanism that prevents activation of said device when said cover is absent.

25. The device according to claim 1, wherein a plate is provided that extends outwardly of the periphery of the open end of said cylinder.

26. An animal or fish stunning device comprising:

an assembly comprising a pneumatic gun connected to a piston within an open-ended cylinder, the gun being mounted to a frame comprising parallel rails;

a support into which said assembly is pivotally fitted via said rails, the support comprising a planar base member and planar side members, wherein said assembly is positioned with respect to said base member to define a space between said base member and said cylinder open end for receiving a head of an animal or fish, and wherein said piston can extend partially into said space; and a trigger for activating extension of said piston when said trigger is contacted by the head of said animal or fish when positioned in said space, said trigger comprising a contact plate that is adjustably linked to a pivot frame having a first pushrod extending therefrom for contacting an activating button of said gun; and a second, pneumatically operated, pushrod that disengages said first pushrod from said button immediately after activation of said button to prevent refiring of said piston while said head of said animal or fish is in contact with said trigger; wherein said pivot frame is biased to a pre-firing position and said first pushrod is biased towards said button.

\* \* \* \* \*